INVENTORS
JAMES L. KRAUSER
ROLAND D. ROTHENBERGER
BY Charles A. Johnson
ATTORNEY

United States Patent Office 3,482,227
Patented Dec. 2, 1969

3,482,227
COMMON MODE CHOKE FOR PLURAL GROUPS OF MEMORY ARRAY DRIVE-RETURN LINE PAIRS

Roland D. Rothenberger, Coon Rapids, and James L. Krauser, St. Paul, Minn., assignors to Sperry Rand Corporation, New York, N.Y., a corporation of Delaware Filed Nov. 25, 1966, Ser. No. 597,029
Int. Cl. G11b *5/00;* H04b *3/28;* H01p *5/12*
U.S. Cl. 340—174 8 Claims

ABSTRACT OF THE DISCLOSURE

Scheme for the coupling of a magnetizable core to the drive return line pairs of a magnetizable memory array for providing current balancing and common mode current signal rejection therein.

Background of the invention

The preferred embodiment of the present invention relates to a memory system comprising an array of magnetizable cores wherein it is assumed that the inductive and capacitive coupling between the drive lines and the sense lines of the array is a major source of undesirable noise signals in the sense line. It was prior art memory system practice to couple the ends of the looped sense line to a differential amplifier whereby the common mode signal was expected to be self-cancelling. This self-cancelling action was expected to provide a difference signal at the differential amplifier that would be representative of the switching signal that was induced in the sense line by the interrogated, or readout, memory elements. Because such differential amplifier arrangements have not successfully eliminated the noise signals that have been induced in the looped sense lines due to the signals flowing in the drive lines, subsequent memory systems have incorporated a common mode choke in the looped sense line at its "open" end. The common mode choke is generally a toroidal ferrite core of high permeability about which is wound the "open" ends of the input-output lines of the looped sense line. This arrangement has increased the balance of the "input" and "output" current signals in the looped sense line and has reduced the common mode current signals that circulate around the sense line loop. For illustrations of some prior art arrangements see: G. H. Guttroff, patent No. 3,283,311; Publication, W. M. DeMatteis et al., Electronic Design, Aug. 2, 1962, pages 72–75; Publication, J. Jursik, Control Engineering, August 1963, pages 61–66; Publication, C. F. Chong et al., Electronic Design, Aug. 3, 1964, pages 38–40.

Summary of the invention

The above discussed prior art practice has been an attempt to eliminate a result, i.e., the noise signals that were inductively and capacitively coupled to the sense line by signals flowing in the drive lines. The present invention attacks the cause of such sense line noise signals by coupling the drive lines to a common mode choke and thus eliminating the drive line signals that cause such noise signals to be induced in the sense line. In the preferred embodiment of the present invention the open ends of all of the looped drive lines of at least one drive line axis are coupled to a single magnetizable core that functions as a common mode choke. This operates to balance the input and output current signals in the coupled drive lines and to minimize capacitive coupling between the coupled drive lines and the sense line.

The present invention relates to a novel method of utilizing a single magnetizable core in a common mode choke for all combinations of A input and B return lines in the selection system of an array of magnetizable memory elements, or cores, and further provides cabling all such A input and B return lines into a compact cable such that each of the AB combinations is essentially a transmission line. With the double-ended selection of such systems the prior are method of common mode choke use would require a separate core for each of the AB combinations while the present invention utilizes a single core for all of the AB combinations. In those memory systems utilizing double-ended diode selection of the drive lines along both the X-axis and Y-axis a single common mode choke may be coupled to both the X-axis and Y-axis drive lines. Alternative arrangements may utilize a first common mode choke to couple the X-axis drive lines and a second common mode choke to couple the Y-axis drive lines.

Accordingly, it is a primary object of the present invention to provide a novel method of reducing spurious noise signals in a memory system sense line.

It is a further object of the present invention to provide a memory system whereby a single common mode choke is coupled to the open ends of all of the looped drive lines of a single axis selection system.

It is a further object of the present invention to provide a memory system whereby a single common mode choke is coupled to the open ends of all of the looped drive lines of a single axis selection system that may be simultaneously utilized as drive and return lines in a memory system.

These and other more detailed and specific objectives will be disclosed in the following specification, reference being had to the accompanying drawings in which.

The present invention assumes that coupling between the drive lines and the sense lines in an array of magnetizable memory elements is a primary source of undesirable, spurious, noise signals in the coupled sense line. As stated above the concept of the present invention involves the use of a well-known common mode choke device for all combinations of A input and B output lines of a typical magnetizable memory selection scheme. In the arrangement of the present invention the input and output lines of the particular selection axis are coupled to a single magnetizable core and are closely coupled in a single cable whereby each of the AB combinations of the input and output lines forms a transmission line. In the preferred embodiment each input and output line are formed in a twisted pair to provide the optimum characteristics of a twisted pair transmission line system. This system minimizes the capacitive coupling between the particular axis drive lines and the associated sense line for minimizing spurious noise signals in such sense line. This arrangement provides both current balancing and common mode rejection of the current signals in the looped drive lines that are assumed to be the major cause of the spurious noise signals in the coupled sense line.

Figure 1:
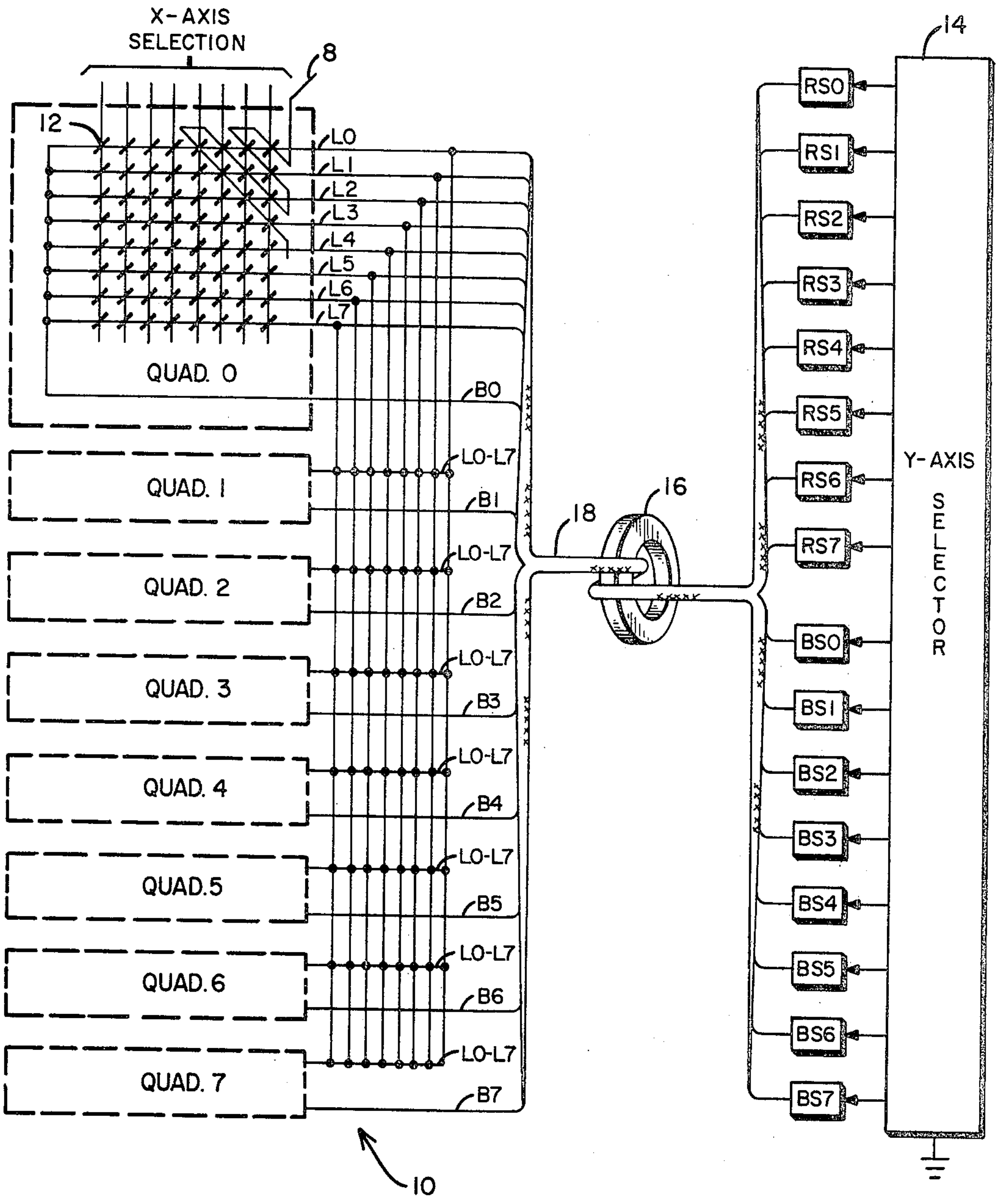
FIG. 1 is an illustration of a first preferred embodiment of the present invention in which a single common mode choke is coupled to the open ends of all of the looped drive lines of a single axis selection system.

With particular reference to FIG. 1 there is illustrated a first preferred embodiment of the present invention in which a single magnetizable core, performing the function of a common mode choke, is coupled to the open ends of all of the looped drive lines of one axis, such as the Y-axis, of a double-ended selection system. The illustrated memory system consists of eight two-dimensional arrays, referred to as quadrants and designated Quad 0 through Quad 7, each two-dimensional array being comprised of 64 cores 12 arranged in an eight-by-eight array forming 64 cores 12 per array, all coupled by a sense line 8. As is well known, such memory system selection systems, as in coincident current operation, are arranged in two sets of orthogonal drive lines oriented along what may be described as the X and Y axes. Only one memory core 12 is common to one drive line of each of the X and Y axes whereby selection of such common core 12, either for the reading therefrom or the writing therein, is achieved by the concurrent coupling of a half-select current signal to such X and Y drive lines. Thus, in an eight-by-eight array of memory cores 12 the selection of one of the X-axis drive lines and of one of eight Y-axis drive lines and of one of eight Y-axis drive lines fully selects only that one memory core 12 that is at the intersection of the selected X and Y drive lines. The illustrated embodiment of FIG. 1 shall be discussed as being representative of a typical, one-dimensional, Y-axis selection system which selection system is well-known in the art.

In the Y-axis illustrated double-ended selection system of FIG. 1 one line of lines L0–L7 of each array of Quad 0–Quad 7 is selected i.e., coupled by a predetermined current signal, by the selection, i.e., concurrent activation, of one read line selection switch of read switches RS0–RS7 and of one bus line selection switch of bus switches BS0–BS7. In this arrangement each read switch RS0–RS7 is common coupled, i.e., coupled in parallel, to the first ends of the like-ordered read line of read lines L0 of Quad 0–Quad 7 while each bus switch BS0–BS7 is coupled to the common coupled second ends of all the read lines of a like ordered array, i.e., thus bus switch BS0 is coupled to the common coupled or bused, second ends of lines L0–L7 of Quad 0. Thus, for the selection of one read line out of lines L0–L7 of one array out of Quad 0–Quad 7, Y-axis selector 14 must concurrently activate one read switch and one bus switch. As an example, for the selection of Quad 0 line 0, Y-axis selector 14 must concurrently activate read switch RS0 and bus switch BS0.

As is stated above in the Abstract of the Disclosure the present invention relates to the coupling of a single magnetizable core to the signal-return line paths of a magnetizable memory array for providing current balancing and common mode signal rejection therein. In the illustrated embodiment of FIG. 1 the single magnetizable core 16 is coupled to the cable formed by the open ends, i.e., those ends of the read lines and bus lines that are coupled to their respectively associated switches, of all of the read lines and bus lines of Quad 0–Quad 7 of memory array 10. It is to be noted that each read (input) line functions as a primary winding of core 16 while each bus (return) line functions as a secondary winding on core 16. Accordingly, all combinations of read lines and bus lines are paired causing the common mode choke formed by core 16 to function as a current transformer tending to balance the currents in the selected read line and bus line pair. This current transformer action of core 16 and cable 18 formed by the read lines and bus lines of memory array 10 tends to provide a unit of current on the selected bus line for any unit of current in the selected read line whereby, if the input current, i.e., the current flowing in the selected read line, equals the output current, i.e., the current flowing through the selected bus line, there can be no loss of selected Y-axis drive line current by means of inductive and capacitive coupling to the associated sense lines.

Figure 2:
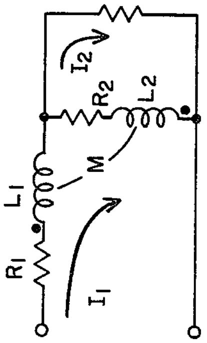
FIG. 2 is an illustration of an approximate circuit schematic a read and bus line pair of FIG. 1.

With particular reference to FIG. 2 there is illustrated an approximate circuit schematic for any read and bus line pair where $L_1$ and $R_1$ represent the primary i.e., read line, line impedance, $L_2$ and $R_2$ represent the secondary, i.e., bus line, line impedance, and $R_3$ represents the coupling path impedance to ground. Assuming steady state currents and voltages and solving for $I_2$ in terms of $I_1$ we get:

$$R_3I_2+(I_2-I_1)R_2+(I_2-I_1)jwl_2+I_1jwM=0 \quad (1)$$

$$I_2(R_3+R_2+jwL_2)-I_1[R_2+jw(L_2-M)]=0 \quad (2)$$

$$I_2=I_1\frac{R_2+jw(L_2-M)}{R_3+R_2+jwL_2} \quad (3)$$

and since $M=k\sqrt{L_1L_2}$ and $k\approx1$; $L_1=L_2$ Equation 3 reduces to $$I_2=I_1\frac{R_2}{R_2+R_3+jwL_2} \quad (4)$$

and it therefore follows that the Y-axis drive line current that is coupled into the sense line is inversely proportional to the inductance $L_2$.

With reference back to FIG. 1 note that all the read lines and bus lines of memory array 10 are tightly cabled along the greater part of their respective lengths. With the read lines and bus lines being so cabled a selected read-bus line pair represent a two-wire, open transmission line. Accordingly, the read-bus line combinations of memory array 10 present a high impedance to spurious, i.e., common mode signals and a low impedance to preferred, i.e., core switching or drive, signals. It follows that since the common mode signals are rejected by the common mode choke formed by cable 18 as coupled to core 16 before such common mode signals enter memory array 10 such common mode signals cannot be coupled into the sense line of the associated quadrant, or array. When a transmission line, such as that formed by cable 18, is utilized to carry a current signal that appears as two signals with one signal on each of the input and output lines and each 180° out of phase with each other (hereinafter referred to as being a preferred signal), the energy waves traveling down the transmission line provide total zero current flow at any infinitesimal section in the line. That is to say, for any such section in the line, the current flow in one direction in one wire is equal to the currrent flow in the other direction in the other wire. Such a transmission line arrangement maintains the flux that is provided by the current flowing in one wire of the transmission line equal but opposite to the flux provided by the current flowing in the other wire of the transmission line at all infinitesimal sections along the transmission line. Hence, flux is cancelled everywhere along the noncontiguous surfaces of the paired wires, i.e., selected read-bus line pairs of the transmission line formed by cable 18. As a result, if such a transmission line is wound into a coiled configuration the preferred signals traveling through such transmission lines see no coil inductance, that is, no cumulative inductance results from a coiled configuration, even at those frequencies at which the length of the wire is longer than a fraction of the wave length of the signal traveling through the wire. Alternatively, if signals flowing in the read-bus line pairs are in phase, that is signals having the same polarity (common mode signals) are transmitted along the transmission line, these signals provide a cumulative flux in the coil and as a result the coil provides a high impedance to such common mode signals. Thus, the illustrated embodiment of FIG. 1 provides current balancing and common mode signal rejection therein.

Figure 3:
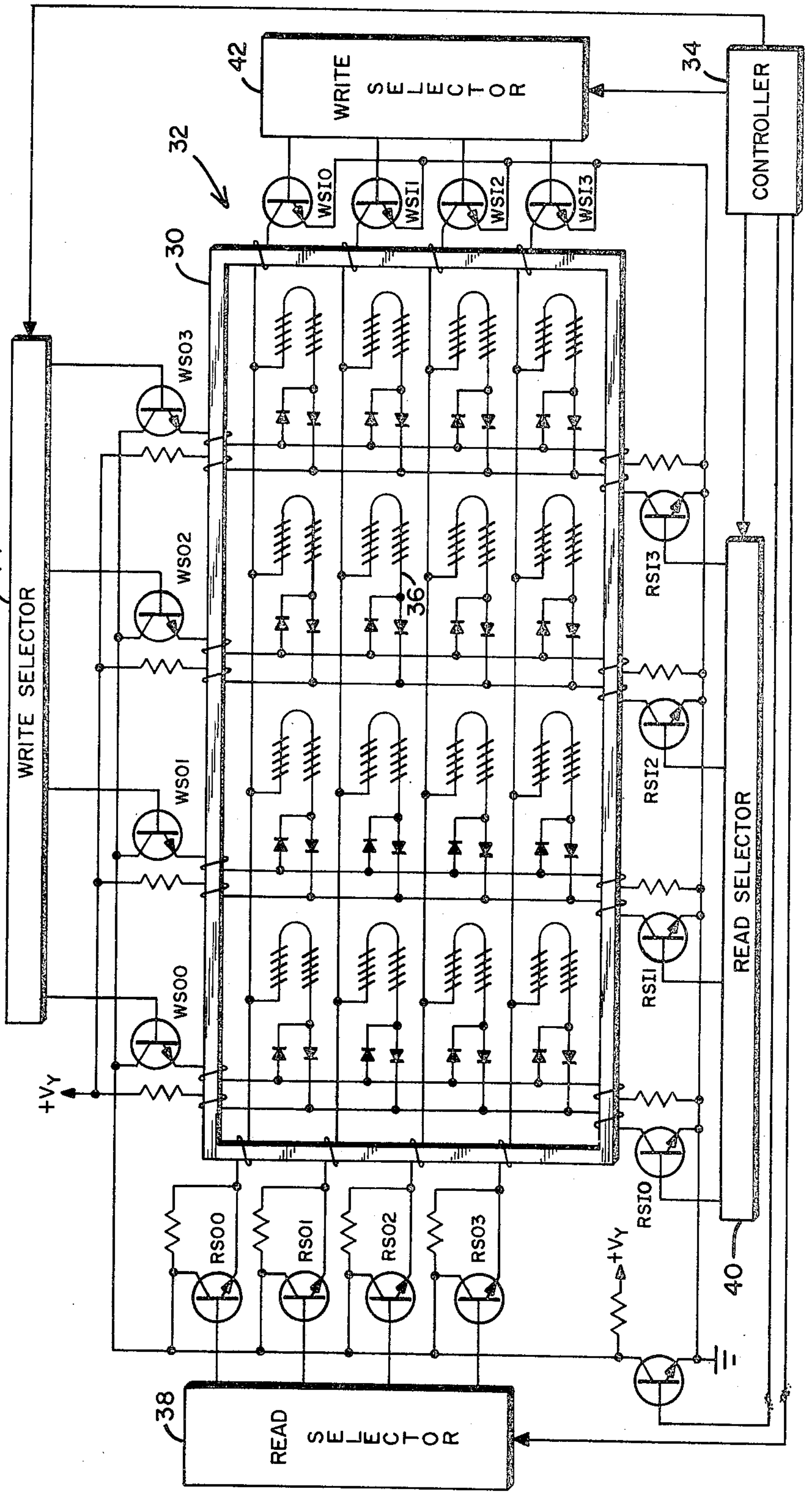
FIG. 3 is an illustration of a second preferred embodiment of the present invention in which a single common mode choke is coupled to the open ends of all of the looped drive lines of both the read and write operation selection systems.

With particular reference to FIG. 3 there is presented a further embodiment of the present invention in which there is illustrated a memory system whereby a single common mode choke is coupled to the open ends of all the looped drive lines of a single selection axis, e.g., Y-axis of a memory selection system. This embodiment is of the 2½ D memory system arrangement as more fully disclosed in the publication, J. E. Smith, Computer Design, October 1966, pages 80–87. In this arrangement of memory array 32, core 30 is coupled to the Y-axis drive lines thereof in the same manner as in FIG. 1 wherein all the read-bus line pairs and write-bus line pairs are closely coupled into a compact cable and thence coupled to core 30. In this arrangement both the read and write selection controls of one axis, e.g. Y-axis, are illustrated. To accomplish the selection of any one Y-axis drive line pair for the read or write operation, control is similar to that of FIG. 1. For the read operation of one read-bus line pair, such as line 36, controller 34 concurrently causes read-selector 38 to activate read switch RSO1 and causes read selector 40 to activate read switch RSI2. For the write selection of line 36, controller 34 concurrently causes write selector 42 to activate write switch WSI1 and causes write selector 44 to activate write switch WSO2. In this arrangement both the current balancing and common mode rejection are accomplished by the single core 30 in both the read and write selection drive line pairs as compared to the illustrated embodiment of FIG. 1 in which such is accomplished in only the read selection drive line pairs.

Thus, it is apparent there has been described and illustrated herein a preferred embodiment of the present invention that provides a novel method of achieving current balancing and common mode rejection of current signals in the drive lines of a memory selection system. It is understood that suitable modifications may be made in the structure as disclosed provided that such modifications come within the spirit and scope of the appended claims. Having, now, fully illustrated and described our invention, what we claim to be new and desired to protect by Letters Patent is set forth in the appended claims.

What is claimed is:

1. An apparatus for providing current balancing and common mode current signal rejection in plural groups of drive-return line pairs of a memory array, comprising:

a memory array;

a first set of drive lines coupled to said memory array;

a first common return line;

means for common coupling the second ends of the drive lines of said first set to the second end of said first common return line;

a first transmission line formed by cabling the first ends of the drive lines of said first set and the first end of said first common return line;

a high permeability first core; and, a common mode choke formed by inductively coupling the so-formed first transmission line to said first core.

2. The apparatus of claim 1 further including:

means for coupling a first current signal to a selected one of the drive lines of the first set for causing the selected drive line of the first set and the first common return line to function as a first selected drive-return line pair; and, said first current signal flowing through said first selected drive-return line pair being coupled to said common mode choke for causing current balancing and common mode current rejection in said first selected drive-return line pair.

3. The apparatus of claim 2 further including:

a second set of drive lines coupled to said memory array; a second common return line;

means for common coupling the second ends of the drive lines of said second set to the second ends of said second common return line;

a second transmission line formed by cabling the first ends of the drive lines of said second set and the first end of said second common return line;

a high permeability second core; and, a common mode choke formed by inductively coupling the so-formed second transmission line to said second core.

4. The apparatus of claim 3 further including:

means for coupling a second current signal to a selected one of the drive lines of the second set for causing the selected drive line of the second set and the second common return line to function as a second selected drive-return line pair; and, said second current signal flowing through said second selected drive-return line pair being coupled to said common mode choke for causing current balancing and common mode current rejection in said second selected drive-return line pair.

5. The apparatus of claim 4 further including:

means for causing said first and second current signals to be concurrently coupled to said first and second selected drive-return line pairs, respectively.

6. The apparatus of claim 5 wherein said first and second transmission lines are tightly cabled together for forming a single transmission line.

7. The apparatus of claim 6 wherein the first and second cores of the first and of the second transmission lines are one core for forming a single common mode choke with said single transmission line.

8. An apparatus for providing current balancing and common mode current signal rejection in plural groups of drive-return line pairs of a memory array, comprising:

B memory arrays;

B sets of drive lines wherein each set includes A ordered drive lines, each of said sets of drive lines coupled to an associated one of said memory arrays;

B common return lines;

means for common coupling the second ends of the ordered drive lines of each of said sets to the second end of an associated one of said common return lines;

A common drive lines;

means for common coupling the first end of the like-ordered drive line of each of said sets to the first end of an associated one of said common drive lines;

a transmission line formed by cabling the A common drive lines and the B common return lines;

a high permeability core; and, a common mode choke formed by inductively coupling the so-formed transmission to said core.

References Cited

UNITED STATES PATENTS

| | | | |
|---|---|---|---|
| 2,700,129 | 1/1955 | Guanella. | |
| 3,117,304 | 1/1964 | Akmenkalns | 333—12 XR |
| 3,208,044 | 9/1965 | Vogl | 340—174 XR |
| 3,283,311 | 11/1966 | Guttroff | 340—174 |
| 3,324,417 | 6/1967 | Garner | 333—6 XR |

BERNARD KONICK, Primary Examiner

GARY M. HOFFMAN, Assistant Examiner

U.S. Cl. X.R.

333—9, 12